US007240000B2

(12) United States Patent
Harada

(10) Patent No.: US 7,240,000 B2
(45) Date of Patent: Jul. 3, 2007

(54) CONTROL OF SPEECH CODE IN MOBILE COMMUNICATIONS SYSTEM

(75) Inventor: Yutaka Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 754 days.

(21) Appl. No.: 10/345,322

(22) Filed: Jan. 16, 2003

(65) Prior Publication Data

US 2003/0135376 A1 Jul. 17, 2003

(30) Foreign Application Priority Data

Jan. 17, 2002 (JP) ............................ 2002-008760

(51) Int. Cl.
*G10L 21/00* (2006.01)
*G10L 19/00* (2006.01)
*H04J 15/00* (2006.01)
*H04L 12/66* (2006.01)

(52) U.S. Cl. ...................... 704/212; 370/252; 370/352; 370/354

(58) Field of Classification Search ................ 704/275, 704/212
See application file for complete search history.

(56) References Cited

U.S. PATENT DOCUMENTS 6,091,733 A * 7/2000 Takagi et al. ............... 370/401
6,134,242 A * 10/2000 Aftelak ........................ 370/465
6,167,040 A * 12/2000 Haeggstrom ................ 370/352
6,295,302 B1 * 9/2001 Hellwig et al. ............. 370/522
6,650,623 B1 * 11/2003 Varma et al. ............... 370/252
6,650,649 B1 11/2003 Muhammad et al.
6,657,996 B1 * 12/2003 Mladenovic et al. ....... 370/356
6,697,345 B1 2/2004 Corrigan, III et al.
6,697,642 B1 * 2/2004 Thomas ................... 455/562.1
6,836,515 B1 12/2004 Kay et al.

FOREIGN PATENT DOCUMENTS

JP 04-160953 6/1992
JP 05-063833 3/1993

(Continued)

OTHER PUBLICATIONS

Japanese Office Action dated Aug. 2, 2006 with partial English Translation.

*Primary Examiner*—David R. Hudspeth
*Assistant Examiner*—Justin W. Rider
(74) *Attorney, Agent, or Firm*—McGinn IP Law Group, PLLC

(57) ABSTRACT

There is disclosed a method of controlling a speech code of speech communications between mobile terminals via an IP network, between mobile switching centers which are interconnected through the IP network. Two mobile switching centers communicate with each other via the IP network using a field in an IP header of a packet, and determines whether coding processes used by two mobile terminals are the same as each other. If the coding processes are the same as each other, then the two mobile switching centers do not convert the coding process for a speech signal, and transmit speech signals from the mobile terminals directly carried on packets through the IP network. If the coding processes are not the same as each other, then the two mobile switching centers convert the coding process for the speech signal into a general-purpose coding process for the speech signal to be transmitted through the IP network.

18 Claims, 10 Drawing Sheets

FOREIGN PATENT DOCUMENTS

| | | |
|---|---|---|
| JP | 05-336165 | 12/1993 |
| JP | 06-006295 | 1/1994 |
| JP | 06-311233 | 11/1994 |
| JP | 08-070284 | 3/1996 |
| JP | 11-055716 | 2/1999 |
| JP | 11-164363 | 6/1999 |
| JP | 11-298420 | 10/1999 |
| JP | 2000-059400 | 2/2000 |
| JP | 2000-244580 | 9/2000 |
| JP | 2001-245348 | 9/2001 |
| WO | WO 96/19907 | 6/1996 |

* cited by examiner

CONTROL OF SPEECH CODE IN MOBILE COMMUNICATIONS SYSTEM

BACKGROUND OF THE INVENTION

1. Field of the Invention

The present invention relates to speech communications between mobile terminals of a mobile communications system, and more particularly to communications through an IP network present in the communications route.

2. Description of the Related Art

Mobile communications systems employ a speech coding process having a lower bit rate and a high band compression ratio in view of the frequency utilization efficiency in wireless intervals. When mobile terminals belonging to different mobile communications systems communicate with each other, a communications path is established through gateways which interconnect the two mobile communications systems. Even if the mobile communications systems employ the same speech coding process, a signal passing through a transit network is converted by a general-purpose speech coding process such as 64 kPCM unless the gateways and the transit network are compatible with the speech coding process of the mobile communications systems.

FIG. 1 of the accompanying drawings shows a communications path established for communications between conventional mobile communications systems. Mobile switching center (MSC) 903 and mobile switching center 907 belong respectively to different mobile communications systems, and are connected to each other by transit network 906 between the mobile communications systems. A communication path is established between mobile terminal (MT) 901 belonging to one of the mobile communications systems and mobile terminal 910 belonging to the other mobile communications system. Common channel signaling (CCS) of SS7 (Signaling System number 7) is employed between mobile switching centers 903, 907 and mobile terminal 910, and a control signal is separated from a user signal.

Mobile switching center 903 has transcoder 904 and controller 905. Mobile switching center 907 has transcoder 909 and controller 908. Mobile terminal 901 has coder/decoder (codec) 902. Mobile terminal 910 has coder/decoder (codec) 911.

The two mobile communications systems employ the same speech coding process. Therefore, codec 902 and codec 911 encode and decode speech signals according to the same process. Alternatively, codec 902 and codec 911 may have a plurality of speech coding processes and select any one of those speech coding processes. In such a case, codec 902 and codec 911 may have at least one common speech coding process among those plural speech coding processes.

Transcoders 904, 909 convert signals between different coding processes. Transcoders 904, 909 provide a general-purpose speech coding process, such as 64 kPCM, toward transit network 906. Transcoders 904, 909 also provide a speech coding process having a high compression ratio, which the mobile terminals have, toward the mobile terminals. Transcoders 904, 909 convert signals between the speech coding process having a high compression ratio and the general-purpose speech coding process. Usually, one mobile switching center has a plurality of transcoders. When calls are made between the mobile communications system to which the mobile switching center belongs and another mobile communications system, the transcoders are assigned to those calls. The speech coding process specific to the mobile communications system is used between the mobile terminals and the mobile communications system to which the mobile terminals belong, and the speech coding process specific to the transit network is used between the mobile switching centers with the transit network interposed therebetween.

Controllers 905, 908 establish calls, establish communication paths, and assign transcoders to calls.

In FIG. 1, a call is established between mobile terminals 901 and mobile terminal 910. The call is made through a communication path which extends through coder/decoder 902 of mobile terminal 901, transcoder 904 of mobile switching center 903, transcoder 909 of mobile switching center 907, and codec 911 of mobile terminal 910. Speech signals between codec 902 and transcoder 904 and signals between codec 911 and transcoder 909 are processed by the speech coding system having a high compression ratio. Speech signals between transcoders 904, 911 are processed by the general-purpose speech coding system.

Therefore, speech signals are converted twice between different speech coding processes for communications between mobile terminals belonging to different mobile communications systems. Such a connection is referred to as a tandem connection. The tandem connection suffers large speech quality deterioration because signals according to the speech coding system having a high compression ratio are compressed and expanded twice. In order to improve the speech quality, the tandem connection may not be employed, and the codecs of the mobile terminals may directly be associated with each other.

According to 3GPP (3rd Generation Partnership Project), there is proposed TFO (Tandem Free Operation) for directly associating the codecs of mobile terminals with each other using an in-band control signal. According to the TFO, mobile switching center 903 and mobile switching center 907 insert bits for controlling the coding process into in-band user signals in communications to negotiate with each other. If possible, mobile switching center 903 and mobile switching center 907 bypass transcoder 904 and transcoder 909, respectively. In this manner, codec 902 of mobile terminal 901 and codec 911 of mobile terminal 910 are directly associated with each other. Such a connection is referred to as a bypass connection. According to the TFO, the configuration may switch from the bypass connection back to the tandem connection.

The 3GPP also proposes TrFO (Transcoder Free Operation) for directly associating the codecs of mobile terminals with each other using an out-band control signal. According to the TrFO, a control signal of the coding process is defined as an out-band signal of SS7, i.e., a control signal separated from a user signal, and is used for controlling the bypass connection and the tandem connection.

The above conventional arrangement suffers the following problems: The control process using the in-band control signal is made possible after communications between mobile terminal 901 and mobile terminal 910 have been established. According to the TFO, immediately after a call is made, the transcoders of mobile terminals are used, and the bypass connection is established using the in-band control signal. According to the TFO, therefore, communications of good speech quality based on the bypass connection are not possible immediately after the call is started. The TFO is also problematic in that since control bits are inserted into the user signal, a portion of the user signal is removed when the control bits are transmitted, resulting in a reduction in the communications quality. According to the TFO, furthermore, transit network 906 is limited to an STM network based on PCM, and VoIP cannot be realized using an IP network as transit network 906. According to the TrFO, since the control signal is separated from the user signal, the user signal is not removed upon switching between the tandem connection and the bypass connection, and the tandem connection or the bypass connection can be selected when a call is established. According to the TrFO, as with the TFO, transit network 906 is limited to an STM network based on PCM, and VoIP cannot be realized using an IP network as transit network 906.

SUMMARY OF THE INVENTION

It is an object of the present invention to provide a method of and a system for controlling a speech code to achieve communications of good speech quality through an IP network.

To achieve the above object, the present invention is applied to a communications system having at least two mobile switching centers capable of converting a coding process for a speech signal and interconnected by an IP network. The present invention is also applied to the control of the coding process in the IP network for the speech signal between mobile terminals registered in the two mobile switching centers.

The two mobile switching centers communicate with each other using a field in an IP header of a packet and determine whether coding processes employed by the mobile terminals are the same as each other or not. If the coding processes are the same as each other, then the mobile switching centers do not convert the coding processes used thereby for the speech signal, and transmit the speech signal directly carried on a packet through the IP network. If the coding processes are not the same as each other, then the mobile switching centers convert the coding processes used thereby for the speech signal into a general-purpose coding process for the speech signal to be transmitted through the IP network. Therefore, if the coding processes employed by the mobile terminals are the same as each other, then communications between the mobile terminals registered in the mobile switching centers are directly carried out without the conversion of the coding processes in the mobile switching centers under the control of a control signal transferred in a field in an IP header. Therefore, the quality of the speech signal is prevented from being deteriorated. Since the control signal between the mobile switching centers is transferred using the field in the IP header, the speech signal is not removed for the control of connection switching.

The two mobile switching centers may determine whether there is a coding process that can be used by both the mobile terminals when a call is established. If such a coding process is found, then the mobile switching centers instruct the mobile terminals to use the coding process and stop the conversion of the coding process for the speech signal. Therefore, if there is a coding process that can be used by both the mobile terminals, communications between the mobile terminals are directly carried out without the conversion of the coding processes in the mobile switching centers under the control of a control signal when a call is established between the mobile terminals. Consequently, the quality of the speech signal is prevented from being lowered from the start of the communications.

While the mobile switching centers are transmitting the speech signal directly carried on a packet through the IP network, if either one of the mobile terminals requests supplementary services which cannot be used according to the coding process for the speech signal between the mobile terminals, then the mobile switching centers may start converting the coding process for the speech signal. Therefore, when the user requests supplementary services while the mobile switching centers are communicating with each other according to a connection free of the conversion of the coding process, if the supplementary services cannot be used according to a coding process having a high compression ratio, then the mobile switching centers switch to a connection according to a general-purpose coding process. Accordingly, both the good quality of communications and the use of supplementary services are available.

The present invention may also be used in a communications system having IP switching centers capable of encoding and decoding an analog speech signal according to one of a plurality of coding processes, such as an IP telephone system. In this application, the coding process for the speech signal in the IP network is controlled while IP switching centers are communicating with each other.

If either one of the IP switching centers detects a load on the IP network as exceeding a threshold, then the coding process is changed to a coding process having a lower bit rate. If either one of the IP switching centers detects a load on the IP network as being smaller than a threshold, then the coding process is changed to a coding process having a higher bit rate. Consequently, if the load on the IP network builds up in speech communications through the IP network, the bit rate of the coding process is lowered to reduce the load on the IP network, and if the load on the IP network is reduced, the bit rate of the coding process is increased to increase the quality of the speech signal. Therefore, the IP network is prevented from becoming overloaded, and the speech quality of communications is maintained at as good a level as possible.

The above and other objects, features, and advantages of the present invention will become apparent from the following description with reference to the accompanying drawings which illustrate examples of the present invention.

DESCRIPTION OF THE PREFERRED EMBODIMENTS

A communications system according to an embodiment of the present invention includes a plurality of mobile communications systems. The mobile communications systems are interconnected by an IP network, and terminals of the different mobile communications systems communicate with each other via a communication path through the IP network.

Figure 1:
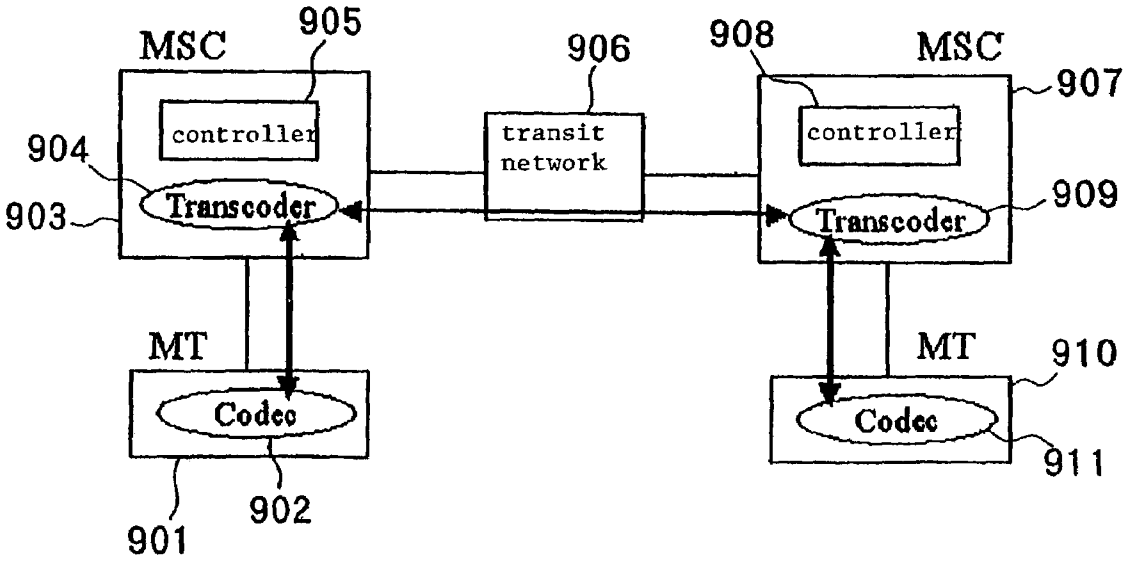
Fig. 1 (Prior art)
FIG. 1 is a block diagram showing a communications path established for communications between conventional mobile communications systems.
Figure 2:
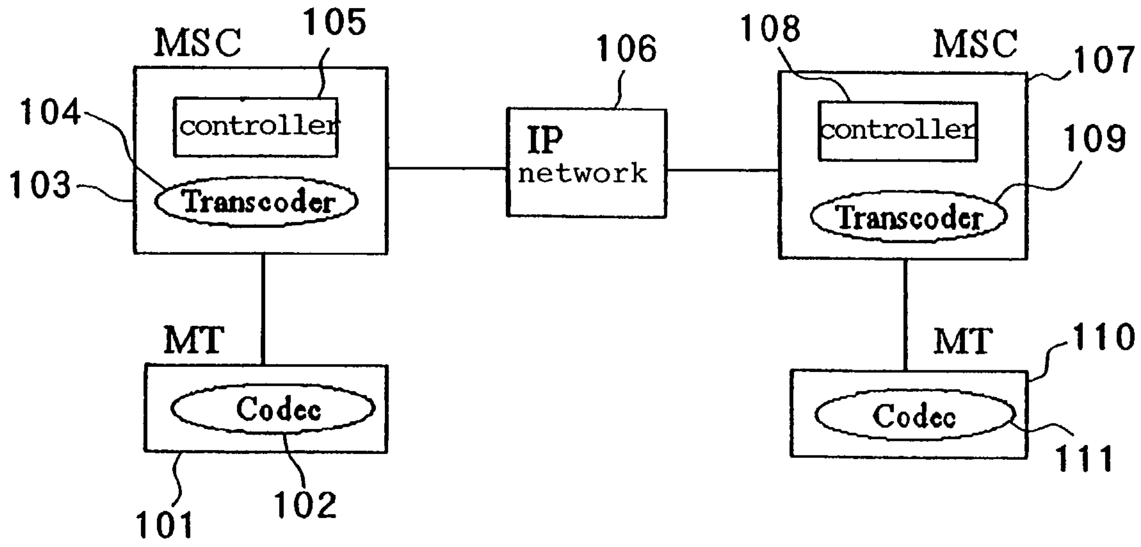
FIG. 2 is a block diagram of a communications system according to an embodiment of the present invention.

As shown in FIG. 2, the communications system according to the embodiment of the present invention has mobile switching centers (MSC) 103, 107, mobile terminals (MT) 101, 110, and IP network 106. Mobile switching centers 103, 107 are elements of respective different mobile communications systems and are interconnected by IP network 106. Mobile terminal 101 is a terminal of the mobile communication system to which mobile switching center 103 belongs, and mobile terminal 110 is a terminal of the mobile communication system to which mobile switching center 107 belongs.

IP network 106 refers to an IP header in the user information of an IP packet of a user speech signal, and performs a routing process based on the IP header to make it possible to carry out communications between the different mobile communications systems. Mobile terminal 101 and mobile terminal 110 communicate with each other according to VoIP (Voice over Internet Protocol) via IP network 106.

Mobile terminal 101 includes coder/decoder (codec) 102. Codec 102 codes an analog speech signal according to a coding process used by the mobile communication system to which mobile switching center 103 belongs, and decodes a speech signal coded by the coding process into an analog speech signal. Similarly, mobile terminal 101 includes coder/decoder (codec) 111. Codec 111 codes an analog speech signal according to a coding process used by the mobile communication system to which mobile switching center 107 belongs, and decodes a speech signal coded by the coding process into an analog speech signal.

Mobile switching center 103 includes transcoder 104 and controller 105. Transcoder 104 converts digital signals between the coding process used by the mobile communication system to which mobile switching center 103 belongs and the coding process used in IP network 106. Controller 105 performs various control processes in mobile switching center 103. Mobile switching center 107 includes transcoder 109 and controller 108. Transcoder 109 converts digital signals between the coding process used by the mobile communication system to which mobile switching center 107 belongs and the coding process used in IP network 106. Controller 108 performs various control processes in mobile switching center 107.

When a call is established between mobile terminals 101, 110 or while mobile terminals 101, 110 are communicating with each other, controllers 105, 108 negotiate with each other through IP network 106 and determines whether transcoder 104 and transcoder 109 are used or not. At this time, if the coding processes of mobile terminals 101, 110 are the same as each other, controllers 105, 108 do not use transcoders 104, 109, and directly associate codecs 102, 111 with each other for thereby reducing a speech quality deterioration.

Figure 3:
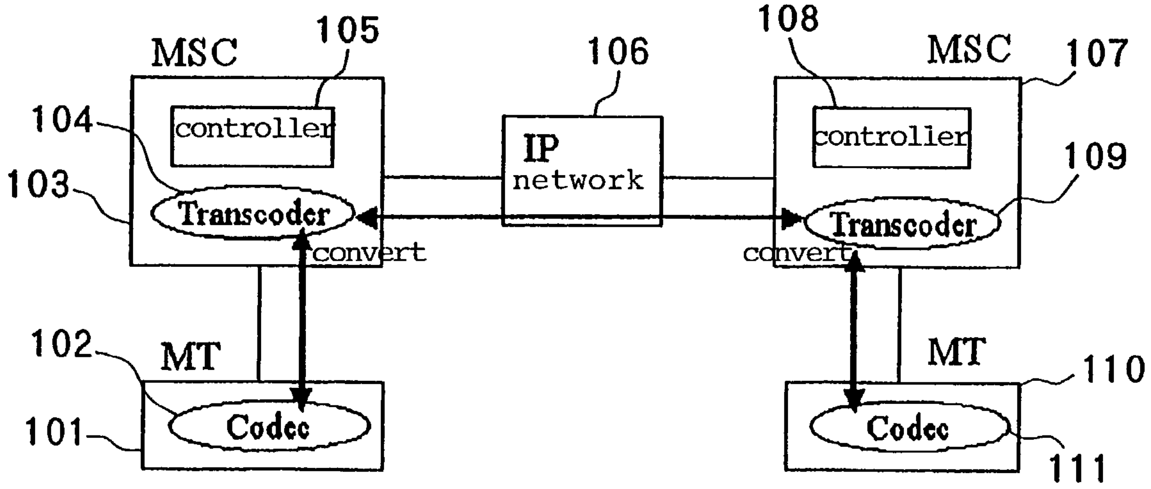
FIG. 3 is a block diagram showing a communications path including a pair of transcoders in the communications system shown in FIG. 2.

FIG. 3 shows a connection through a communications path including a pair of transcoders. The connection using the pair of transcoders is referred to as a tandem connection. The flow of a signal from mobile terminal 101 to mobile terminal 110 in the tandem connection will be described below. However, the description which follows is also applicable to the flow of a signal from mobile terminal 110 to mobile terminal 101.

Codec 102 of mobile terminal 101 encodes an analog speech signal of the user according to the coding process of the mobile communications system to which mobile terminal 101 belongs, and sends the encoded signal through a wireless interval to mobile switching center 103. Transcoder 104 of mobile switching center 103 converts the signal from codec 102 into a signal according to the coding process used in IP network 106, and sends the converted signal through IP network 106 to mobile switching center 107. Transcoder 109 of mobile switching center 107 converts the signal from transcoder 104 into a signal according to the coding process used the mobile communications system to which mobile switching center 107 belongs, and sends the converted signal through a wireless interval to mobile terminal 110. Codec 111 of mobile terminal 110 decodes the signal from mobile switching center 107 into an analog speech signal and outputs the analog speech signal. According to the tandem connection, since the speech code is converted twice between the users, the quality of the speech signal is deteriorated.

Figure 4:
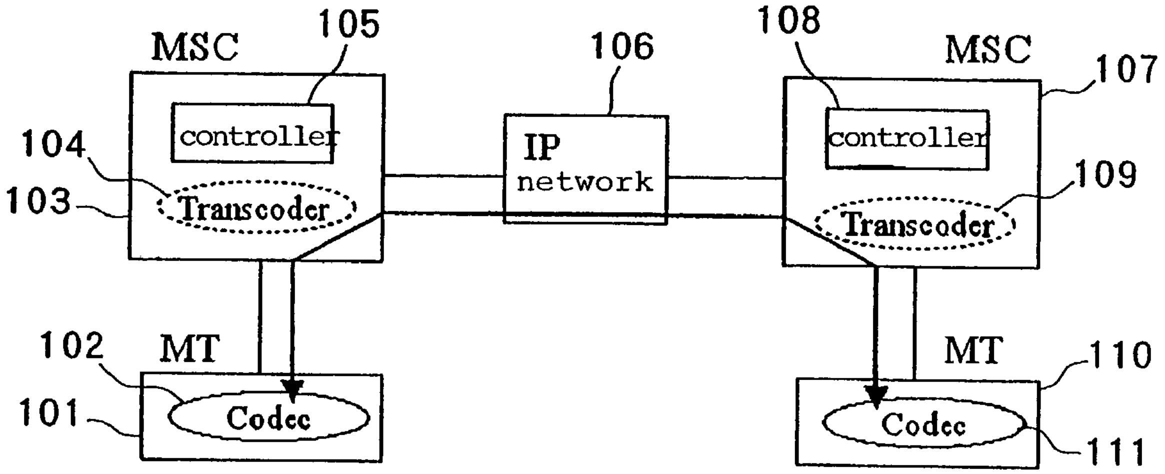
FIG. 4 is a block diagram showing a communications path including no transcoder in the communications system shown in FIG. 2.

A connection which uses no transcoders as shown in FIG. 4 is referred to as a bypass connection. The flow of a signal from mobile terminal 101 to mobile terminal 110 in the bypass connection will be described below. However, the description which follows is also applicable to the flow of a signal from mobile terminal 110 to mobile terminal 101.

Codec 102 of mobile terminal 101 encodes an analog speech signal of the user according to the coding process of the mobile communications system to which mobile terminal 101 belongs, and sends the encoded signal through a wireless interval to mobile switching center 103. In the bypass connection, transcoder 104 of mobile switching center 103 is not employed. The signal from codec 102 is sent, with its coding process unchanged, via IP network 106 to mobile switching center 107. In the bypass connection, transcoder 109 of mobile switching center 107 is not employed either. The signal from codec 102 is sent via a wireless interval to mobile terminal 110. Codec 111 of mobile terminal 110 decodes the signal from codec 102 into an analog speech signal and outputs the analog speech signal. According to the bypass connection, since the speech code is not converted between the users, the quality of the speech signal is not deteriorated.

Figure 5:
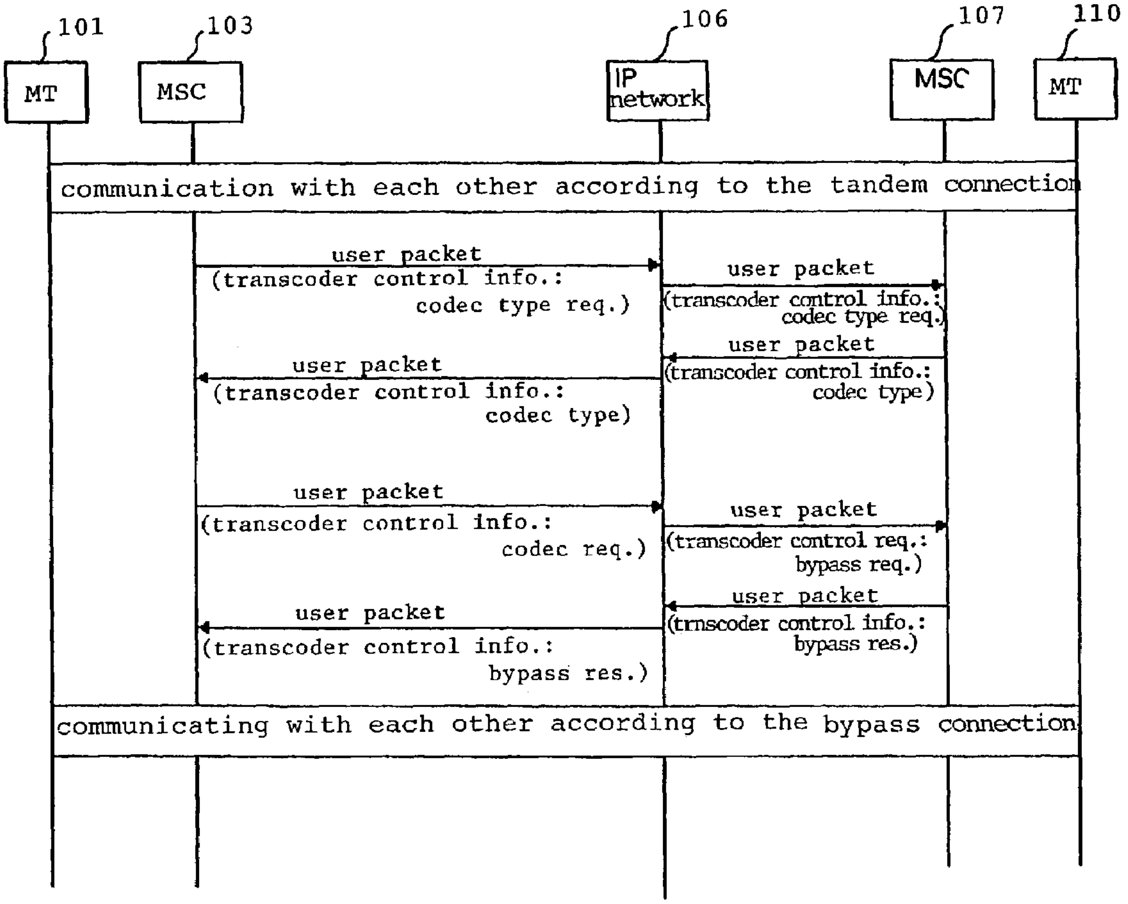
FIG. 5 is a sequence diagram showing a connection switching process in the communications system shown in FIG. 2.

Operation of the communications system according to the present embodiment will be described below. FIG. 5 shows a process of switching from the tandem connection to the bypass connection after communications between mobile terminals 101, 110 are established according to the tandem connection. Mobile terminals 101, 110 are communicating with each other according to the tandem connection as shown in FIG. 3. The communications according to the tandem connection are established according to the conventional process.

Figure 6:
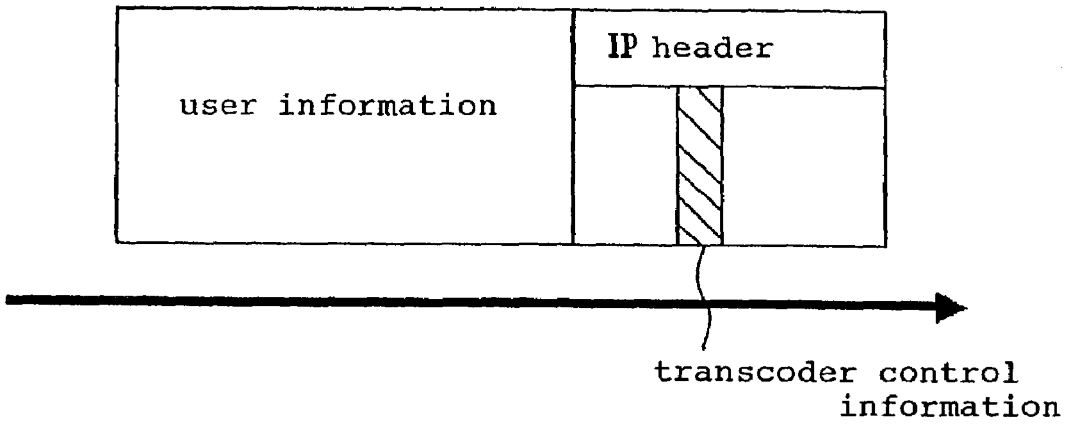
FIG. 6 is a diagram of the format of a user packet containing transcoder control information in the communications system shown in FIG. 2.

Mobile switching center 103 transmits transcoder control information representing a code type request through IP network 106 to mobile switching center 107. FIG. 6 shows the format of a user packet containing transcoder control information. The arrow in FIG. 6 indicates the direction in which the user packet is sent. As shown in FIG. 6, the transcoder control information is inserted in a field defined in an IP header of the packet and transferred with the packet. The transcoder control information is control information for switching between the tandem connection and the bypass connection between the mobile switching centers. The codec type request is a signal for asking about the coding process used by the mobile terminal to communicate with.

Having received the transcoder control information representing the code type request, mobile switching center 107 returns transcoder control information representing a code type to mobile switching center 103. The codec type is a signal indicative of the coding process used by the mobile terminal. Mobile switching center 103 which has received the transcoder control information representing the code type determines whether it is possible to switch from the tandem communication to the bypass communication or not.

Figure 7:
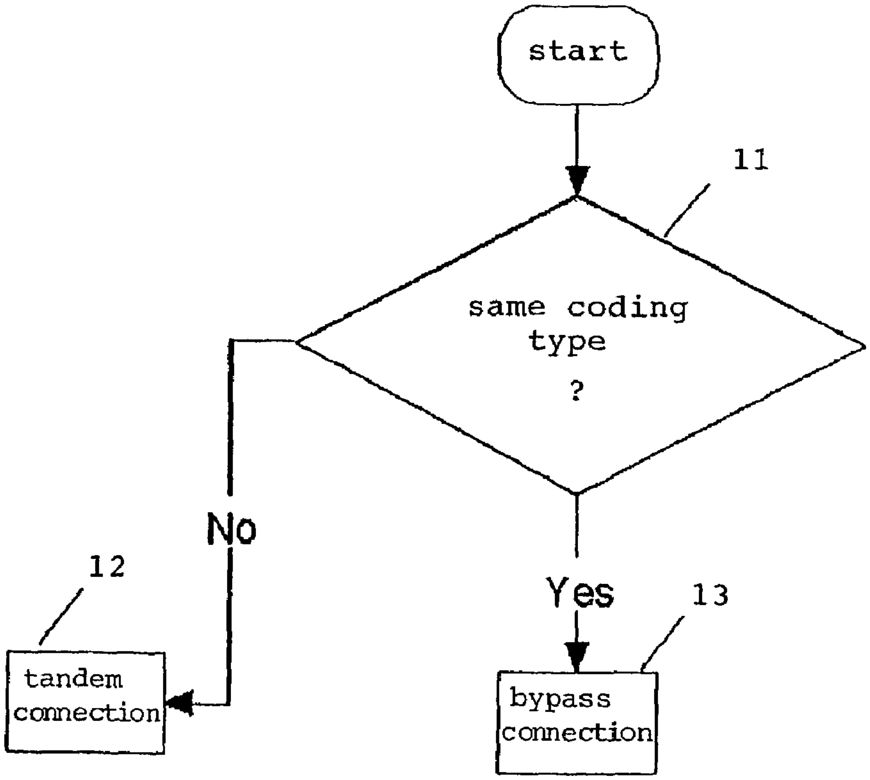
FIG. 7 is a flowchart of an operation sequence of a mobile switching center for determining whether it is possible to switch to a bypass connection.

Specifically, as shown in FIG. 7, the mobile switching center which has received the transcoder control information representing the code type determines whether the coding process used by the mobile terminal to communicate with and the coding process used by the mobile terminal of its own are the same as each other in step 11. If the coding processes are different from each other, then the mobile switching center does not switch from the tandem communication to the bypass communication, but maintains the tandem connection in step 12. If coding processes are the same as each other, then the mobile switching center switches from the tandem communication to the bypass communication in step 13.

If it is possible to switch from the tandem communication to the bypass communication, then mobile switching center 103 sends transcoder control information representing a bypass request to mobile switching center 107. The bypass request is a signal for requesting switching from the tandem communication to the bypass communication. Having received the transcoder control information representing the bypass request, mobile switching center 107 bypasses transcoder 109 therein, and returns transcoder control information representing a bypass response to mobile switching center 103. The bypass response is a signal indicating that the tandem communication has switched to the bypass communication in response to the bypass request. Mobile switching center 103 which has received the transcoder control information representing the bypass response bypasses transcoder 104 therein. In this manner, the tandem connection for communications between mobile terminals 101, 110 switches to the bypass connection as shown in FIG. 4.

With the communication system according to the present embodiment, since the connection for communications between mobile terminals 101, 110 interconnected via IP network 106 is changed from the tandem connection to the bypass connection, the speech quality of the communications through IP network 106 is prevented from being lowered.

Figure 8:
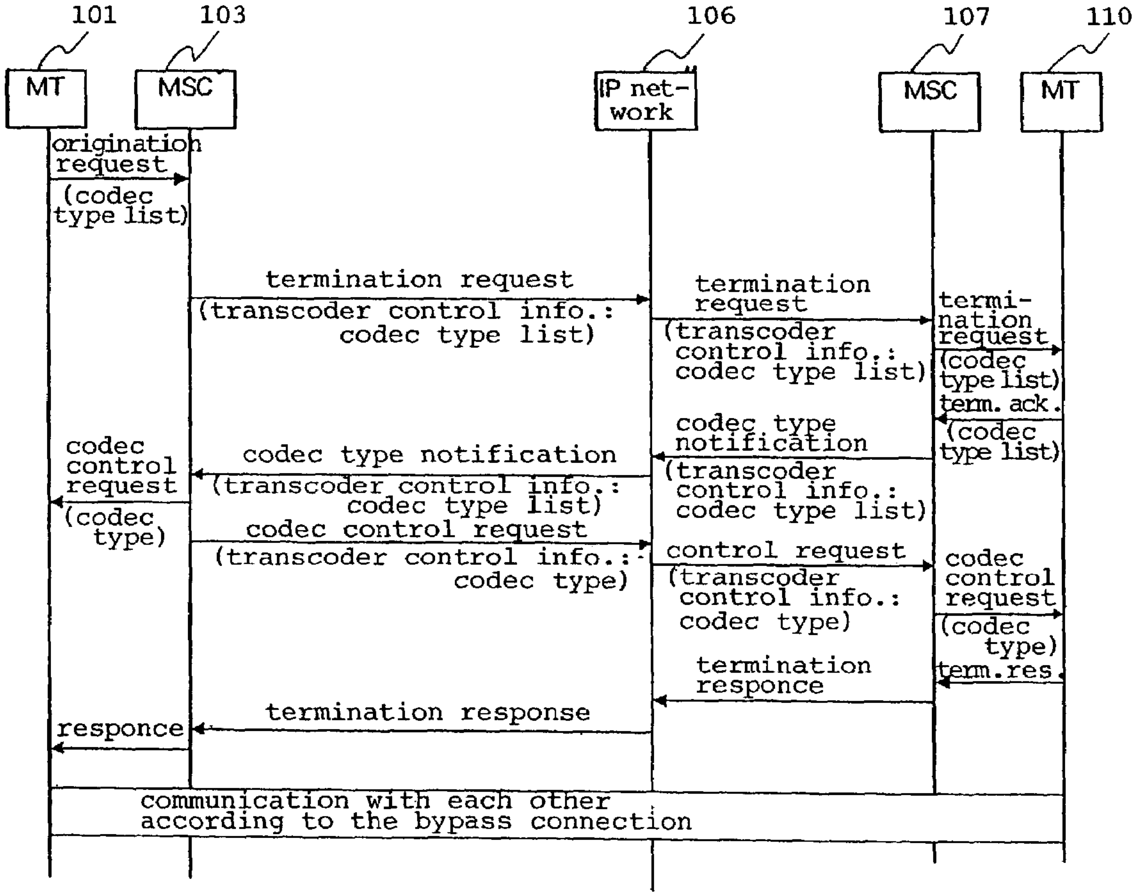
FIG. 8 is a sequence diagram showing an operation sequence of the communications system shown in FIG. 2 when it makes the bypass connection for establishing a call.

The communication system according to the present embodiment makes it possible to establish the bypass connection from the time a call is made. FIG. 8 shows an operation sequence of the communications system according to the present embodiment for making the bypass connection at the time mobile terminal 101 originates a call to mobile terminal 110. Mobile terminal 101 sends an origination request to mobile switching center 103. The origination request serves to request mobile switching center 103 to establish communications with mobile terminal 110. The origination request contains a codec type list. The codec type list is a list of coding processes that can be used by codec 102 of mobile terminal 101.

Then, mobile switching center 103 sends a packet of a termination request through IP network 106 to mobile switching center 107. The packet of a termination request contains the codec type list from mobile terminal 101 as transcoder control information. Having received the packet of a termination request which contains the codec type list, mobile switching center 107 sends the termination request to mobile terminal 110. Mobile terminal 110 which has received the termination request containing the codec type list extracts coding processes that can be used by both mobile terminal 101 and mobile terminal 110, from the coded type list from mobile terminal 101 and the coding process that can be used by codec 111 of mobile terminal 110. Mobile terminal 110 then sends a termination acknowledgement containing a codec type list of extracted coding processes to mobile switching center 110. The termination acknowledgement is a signal indicating the acknowledgement of the termination request.

Mobile switching center 110 which has received the termination acknowledgement from mobile terminal 110 sends a packet of a codec type notification to mobile switching center 103. The packet of a codec type notification is a packet for indicating a list of coding processes that can be used by the codecs of the mobile terminals. The packet of a codec type notification contains a codec type list as transcoder control information.

Having received the packet of a codec type notification, mobile switching center 103 selects one of the coding processes containing in the codec type list as the transcoder control information, bypasses transcoder 104 therein, and sends a codec control request to mobile terminal 101. The codec control request is a signal for indicating a coding process to a mobile terminal. The codec control request contains a codec type indicative of the selected coding process. Codec 102 of mobile terminal 101 which has received the codec control request will subsequently use the indicated coding process.

Mobile switching center 103 sends a packet of a codec control request indicative of the selection of a coding process to mobile switching center 107. The packet of a codec control request serves to instruct mobile switching center 107 to select the same coding process as the coding process indicated to mobile terminal 101. The packet of a codec control request contains a coding process indicated to be selected as transcoder control information. Having received the packet of a codec control request, mobile switching center 107 sends a codec control request to mobile terminal 110. The codec control request contains, as a codec type, the coding process which is contained in the packet of the codec control request. Codec 111 of mobile terminal 110 which has received the codec control request will subsequently use the indicated coding process.

When the user of mobile terminal 120 responds to the termination, mobile terminal 110 sends a termination response to mobile switching center 107. The termination response is a signal for indicating a response to a termination to a mobile switching center. Mobile switching center 107 which has received the termination response sends a packet of the termination response to mobile switching center 103. Mobile switching center 103 which has received the packet of the termination response sends a response to mobile terminal 101. The response is a signal indicative of a response to the origination request from mobile terminal 101.

In this manner, communications between mobile terminals 101, 110 according to the bypass connection are started.

Figure 9:
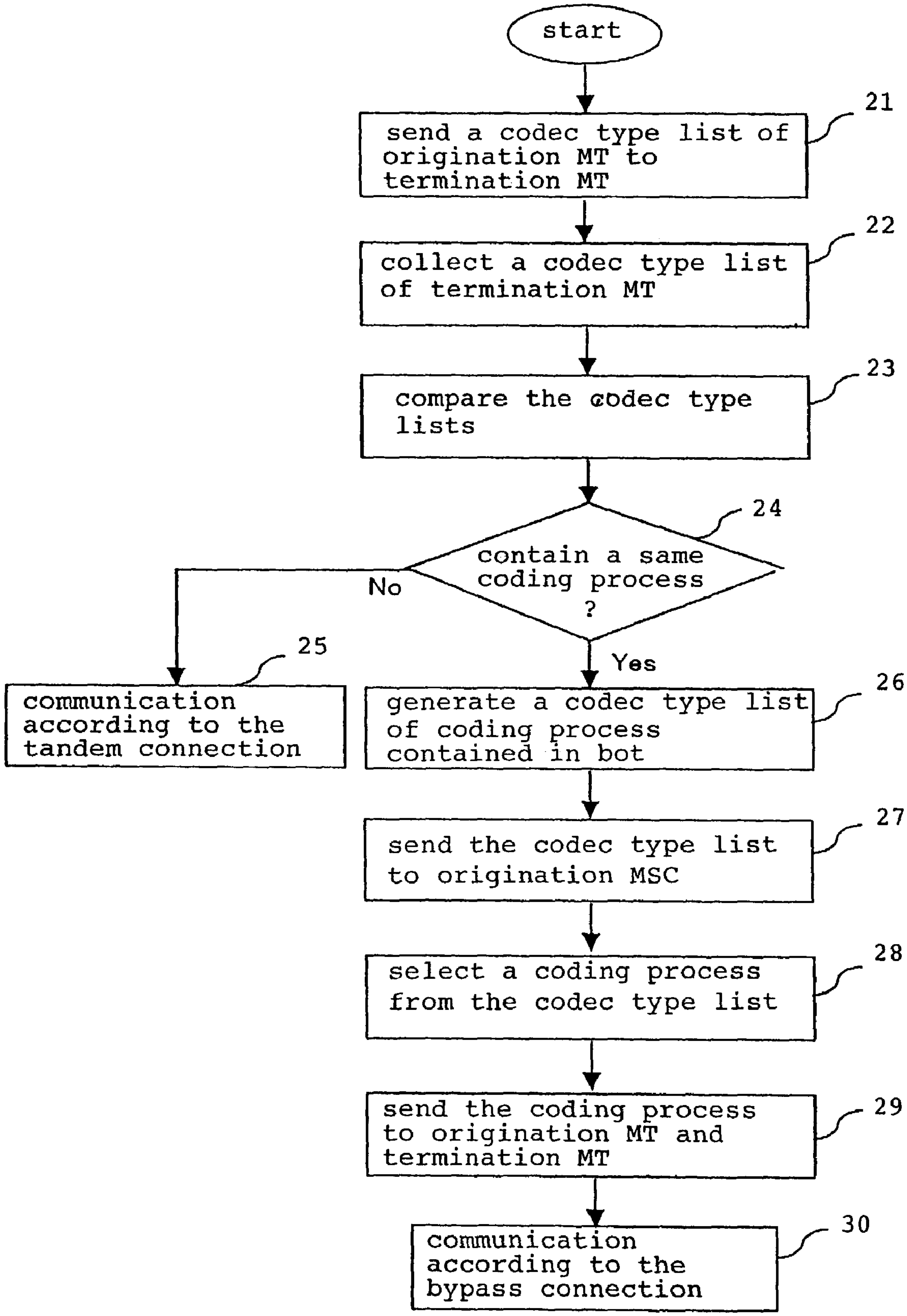
FIG. 9 is a flowchart of an operation sequence of the communications system shown in FIG. 2 when it makes the bypass connection for establishing a call.

As shown in FIG. 9, when mobile terminal 101 starts to establish a call, mobile terminal 101 sends a codec type list of its own to mobile terminal 110 on a termination side in step 21. Then, mobile terminal 110 collects a codec type list of its own in step 22. Mobile terminal 110 compares the codec type list of mobile terminal 101 with the codec type list of its own in step 23.

Mobile terminal 110 determines whether there is a coding process contained in both the codec type list of mobile terminal 101 and the codec type list of its own in step 24. If there is no coding process contained in both the codec type lists, then the communication system establishes communications between mobile terminals 101, 110 according to the tandem connection in step 25. If there are coding processes contained in both the codec type lists, then mobile terminal 110 generates a codec type list of coding processes contained in both the codec type lists in step 26. Then, mobile terminal 110 indicates the generated codec type list to mobile switching center 103 on the origination side in step 27.

Mobile switching center 103 selects one coding process from the codec type list indicated by mobile terminal 110 in step 28. Mobile switching center 103 indicates the selected coding process to mobile terminal 101 and mobile terminal 110 in step 29. The communication system then establishes communications between mobile terminals 101, 110 according to the bypass connection in step 30.

With the communication system according to the present embodiment, since the bypass connection can be employed at the time a call is made between mobile terminals 101, 110 via IP network 106, the speech quality of the communications between mobile terminals 101, 110 through IP network 106 is prevented from being lowered from the time when the communications start.

Generally, communication systems provide various supplementary services which the users can use by operating pushbuttons or the like on the terminals. According to the bypass connection, based on the premise that mobile terminal 101 on the origination side and mobile terminal 110 on the termination side employ the same coding process, the transcoders 104, 109 in mobile switching centers 103, 107 are bypassed. According to the bypass connection, since a speech signal is transferred through IP network 106 according to the coding process specific to the mobile communication systems, mobile terminal 101 or mobile terminal 110 cannot directly be connected to service trunks or sound sources for supplementary services. Therefore, the communication system needs to switch from the bypass connection to the tandem connection for receiving supplementary services.

The communication system according to the present embodiment can switch between the bypass connection and the tandem connection according to a supplementary services request from the user.

Figure 10:
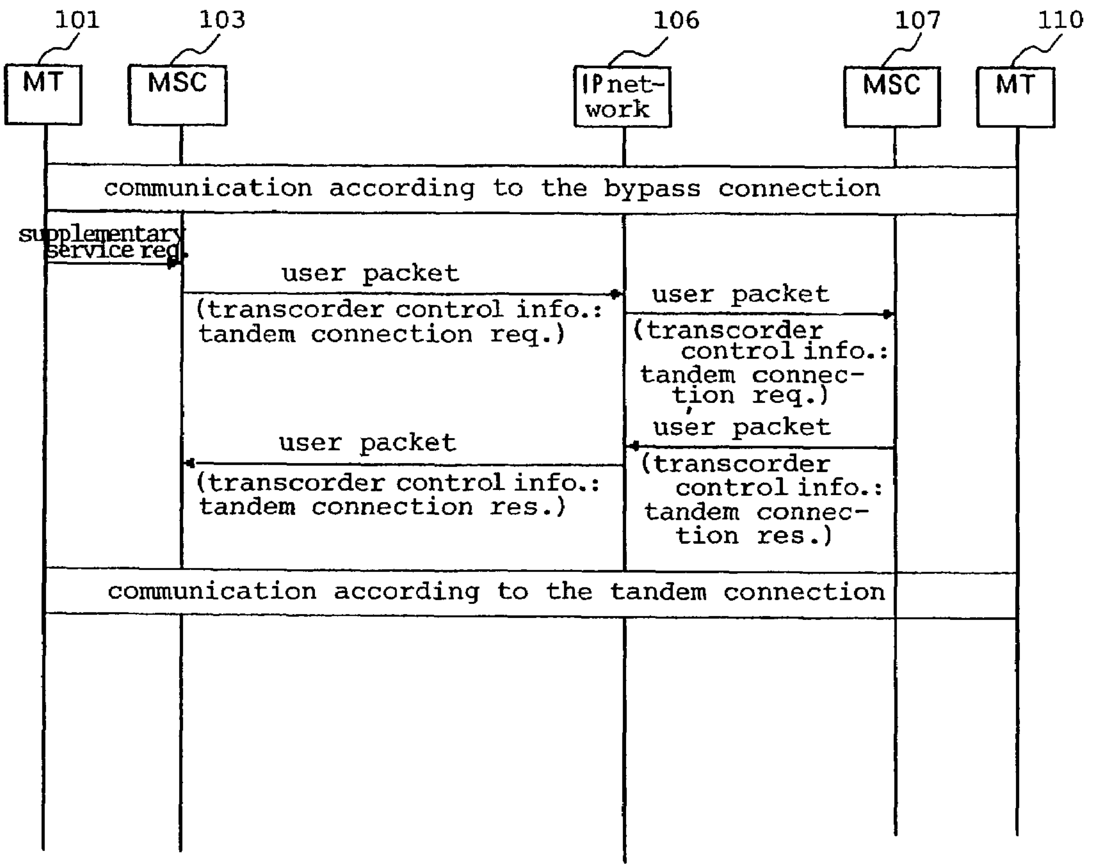
FIG. 10 is a sequence diagram showing an operation sequence of the communications system shown in FIG. 2 when it switches from the bypass connection to a tandem connection according to a user request.

In FIG. 10, mobile terminal 101 and mobile terminal 110 are communicating with each other according to the bypass connection. If the user of mobile terminal 101 makes an action to use supplementary services, mobile terminal 101 sends a supplementary services request to mobile switching center 103. The supplementary services request is a signal for a mobile terminal to request a mobile switching center to provide supplementary services for use by the user.

Having received the supplementary services request, mobile switching center 103 determines whether the bypass connection needs to switch to the tandem connection for providing the requested supplementary services or not. If the bypass connection needs to switch to the tandem connection, then mobile switching center 103 inserts transcoder control information of a tandem connection request into a user packet. The tandem connection request is a signal for the mobile switching center to request an associated mobile switching center to switch from the bypass connection to the tandem connection.

Mobile switching center 107 which has received the tandem connection request uses transcoder 109 which has been bypassed out of service to insert transcoder control information of a tandem connection response into a user packet. The tandem connection response is a signal for a mobile switching center which has received a tandem connection request to indicate, to an associated mobile switching center, the fact that the bypass connection has switched to the tandem connection in response to the tandem connection request. Mobile switching center 103 which has received the tandem connection response uses its own transcoder 104 which has been out of service.

In this manner, the communication system switches from the bypass connection to the tandem connection for the communications between mobile terminals 101, 110. Mobile terminal 101 can now be connected to service trunks and service sources and use supplementary services.

In the communication system according to the present embodiment, when the use of supplementary services from mobile terminal 101 is finished, the tandem connection switches back to the bypass connection according to a process similar to the process shown in FIG. 10.

With the communication system according to the present embodiment, therefore, when the user requests supplementary services while mobile terminals 101, 110 are communicating with each other according to the bypass connection, if the bypass connection needs to switch back to the tandem connection for the purpose of providing supplementary services, then the bypass connection switches to the tandem connection. Since the transcoder control information between the mobile switching centers is transferred with the field in the IP header of the user packet, no speech signal is removed for the connection switching control.

Figure 11:
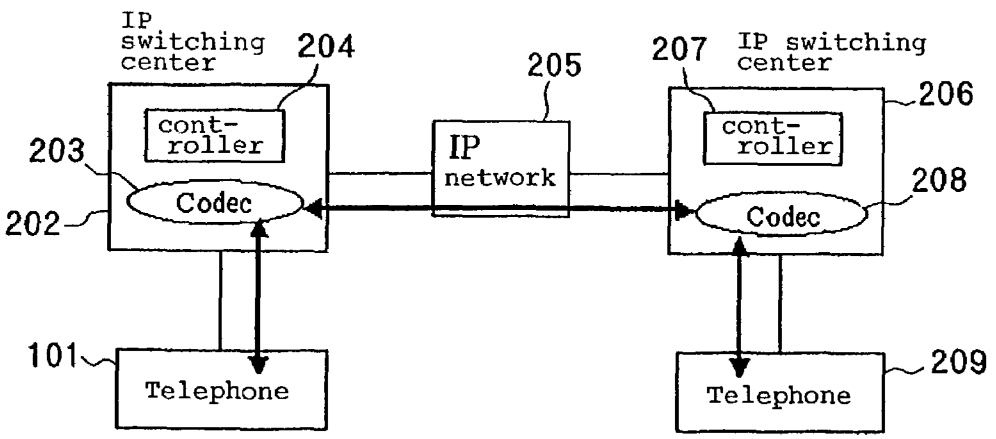
FIG. 11 is a block diagram of a communications system according to another embodiment of the present invention.
Figure 12:
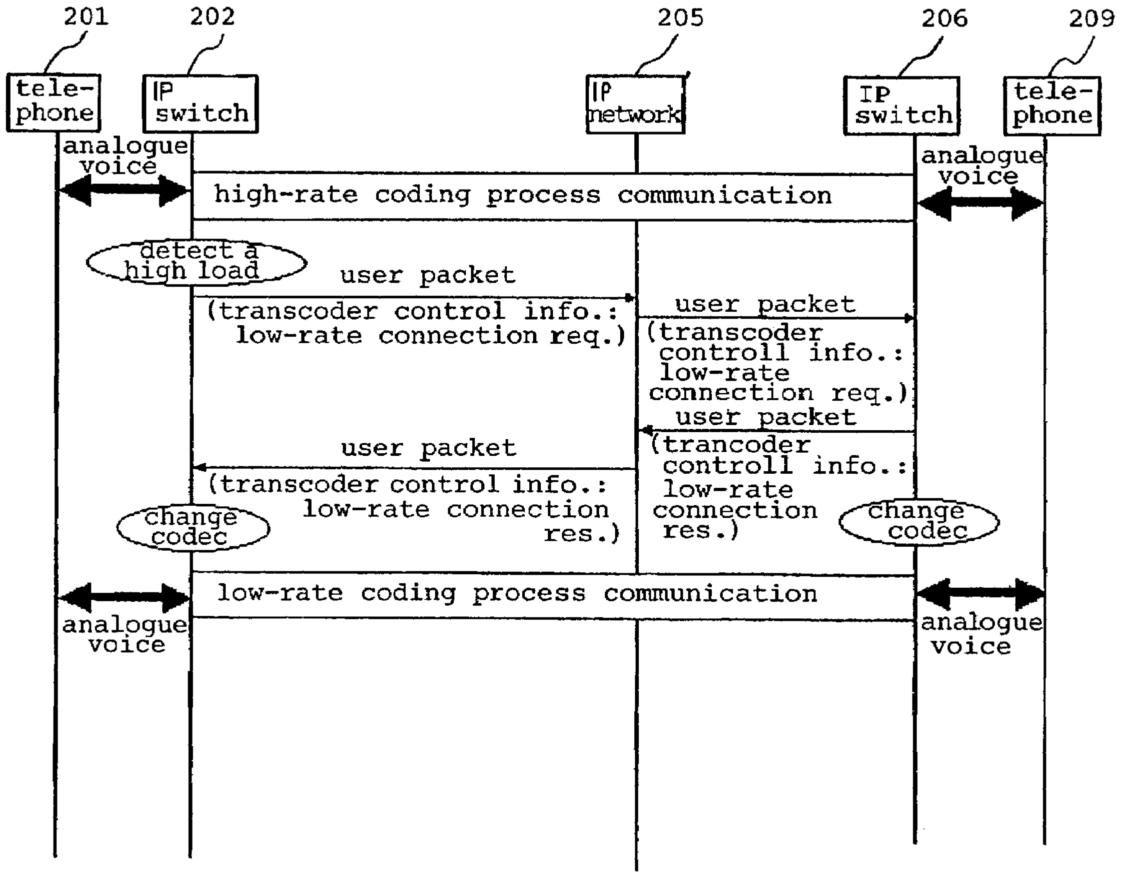
FIG. 12 is a sequence diagram showing an operation sequence of the communications system shown in FIG. 11 when it changes from a speech signal coding process having a higher bit rate to a speech signal coding process having a low bit.
Figure 13:
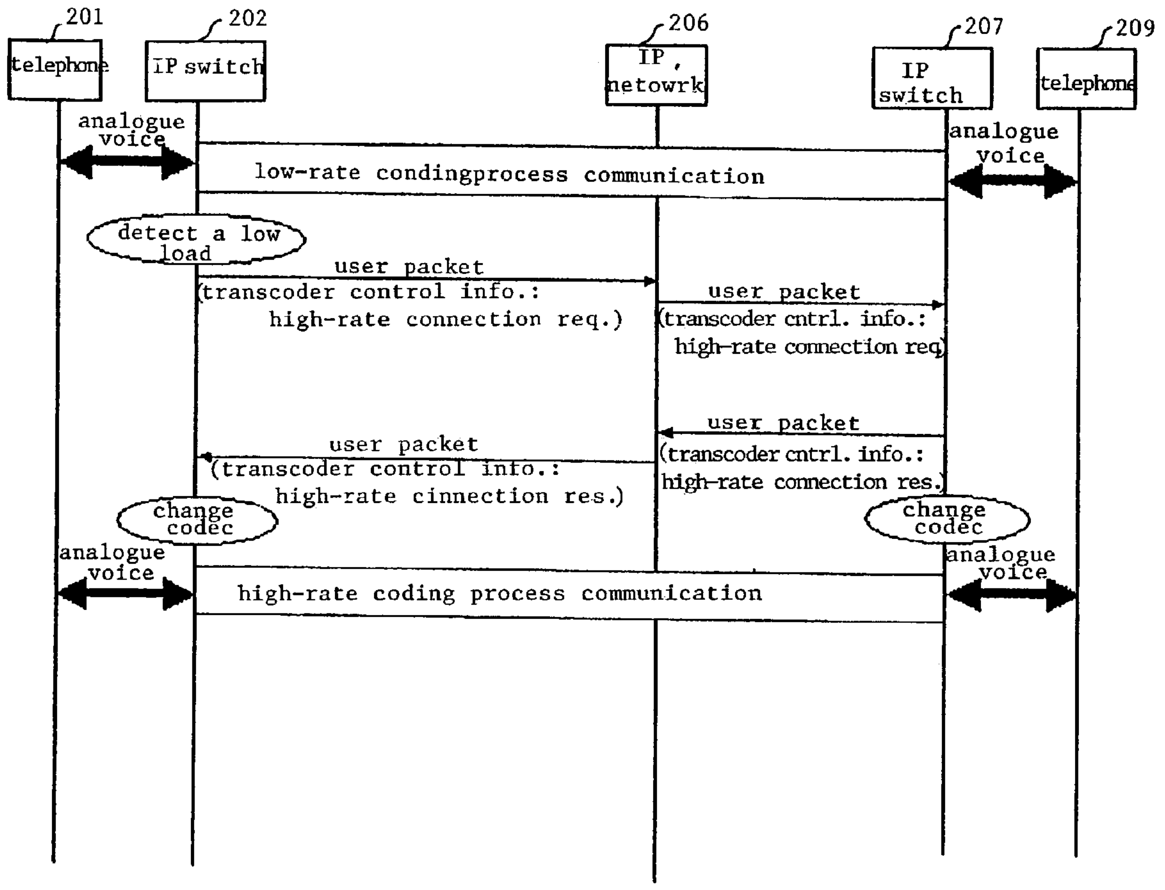
FIG. 13 is a sequence diagram showing an operation sequence of the communications system shown in FIG. 11 when it changes from a speech signal coding process having a lower bit rate to a speech signal coding process having a high bit.

A communications system according to another embodiment of the present invention will be described below with reference to FIGS. 11 through 13. The communications system shown in FIG. 11 differs from the communications system shown in FIG. 2 in that it is a VoIP system for performing communications between fixed telephone sets connected to IP switching centers via an IP network. The communications system shown in FIG. 11 has IP switching centers 204, 206, telephone sets 201, 209, and IP network 205.

IP network 205 refers to an IP header in the user information of an IP packet of a digital speech signal, and performs a routing process based on the IP header to make it possible to carry out communications between telephone sets 201, 209. Telephone sets 201, 209 can communicate with each other according to the VoIP via IP network 205.

Telephone sets 201, 209 are general fixed telephone sets. IP switching center 202 has coder/decoder (codec) 203 and controller 204. Codec 203 encodes an analog speech signal from telephone set 201 into a signal according to a coding process used under VoIP, and decodes an encoded signal into an analog speech signal. The coding process used under VoIP has its rate variable from a lower bit rate to a higher bit rate depending on the load in the network. Controller 204 establishes calls, establishes communication paths, assigns codec 203 to calls, and changes the rates for calls according to VoIP.

Similarly, IP switching center 206 has codec 208 and controller 207. Codec 208 encodes an analog speech signal from telephone set 209 into a signal according to a coding process used under VoIP, and decodes an encoded signal into an analog speech signal. Controller 207 establishes calls, establishes communication paths, assigns codec 208 to calls, and changes the rates for calls according to VoIP.

When the load on IP network 205 builds up, the delay that IP packets suffers in IP network 205 increases. When the load on IP network 205 exceeds a certain threshold, controllers 204, 207 changes the coding process for speech signals transmitted via IP network 205 to a coding process of a lower bit rate which is characterized by a smaller amount of information transmitted per unit time. The load on IP network 205 now decreases, reducing the delay that IP packets suffers in IP network 205. When the load on IP network 205 drops below the threshold, controllers 204, 207 changes the coding process to a coding process having a higher bit rate for better speech quality. The load on IP network 205 can be recognized by an existing technique based on the measurement of a delay of IP packets. The threshold for detecting a high load and the threshold for detecting a low load may be different from each other.

Operation of the communication system shown in FIG. 11 for changing the coding process for speech signals from a coding process of a higher bit rate to a coding process of a lower bit rate will be described below with reference to FIG. 12. In FIG. 12, a coding process of a higher bit rate is initially employed in IP network 205 for communications between telephone sets 201, 209 for better speech quality. When an increase in the load on IP network 205 is detected, IP switching center 202 inserts a low-rate connection request into the field of transcoder control information in a user packet to be transmitted to IP switching center 206. The low-rate connection request is a signal for an IP switching center to request an associated IP switching center to change the speech signal coding process to a coding process of a lower bit rate.

IP switching center 206 which has received the low-rate connection request inserts a low-rate connection response into transcoder control information of a user packet to be transmitted to IP switching center 202. IP switching center 206 then changes the coding process of codec 208 to a coding process of a lower bit rate. The low-rate connection response is a signal indicating, to an associated IP switching center, that the speech signal coding process is changed to a coding process of a lower bit rate in response to the low-rate connection request. Having received the low-rate connection response, IP switching center 202 changes the coding process of codec 203 to a coding process of a lower bit rate. The load on IP network 205 is now lowered, reducing the delay of IP packets.

Operation of the communication system shown in FIG. 11 for changing the coding process for speech signals from a coding process of a lower bit rate to a coding process of a higher bit rate will be described below with reference to FIG. 13. In FIG. 13, a coding process of a lower bit rate is initially employed in IP network 205 for communications between telephone sets 201, 209 for reducing the delay of IP packets. When a reduction in the load on IP network 205 is detected, IP switching center 202 inserts a high-rate connection request into the field of transcoder control information in a user packet to be transmitted to IP switching center 206. The high-rate connection request is a signal for an IP switching center to request an associated IP switching center to change the speech signal coding process to a coding process of a higher bit rate.

IP switching center 206 which has received the high-rate connection request inserts a high-rate connection response into transcoder control information of a user packet to be transmitted to IP switching center 202. IP switching center 206 then changes the coding process of codec 208 to a coding process of a higher bit rate. The high-rate connection response is a signal indicating, to an associated IP switching center, that the speech signal coding process is changed to a coding process of a higher bit rate in response to the high-rate connection request. Having received the high-rate connection response, IP switching center 202 changes the coding process of codec 203 to a coding process of a higher bit rate. The quality of speech signals between telephone sets 201, 209 is now increased.

While preferred embodiments of the present invention have been described in specific terms, such description is for illustrative purposes only, and it is to be understood that changes and variations may be made without departing from the spirit or scope of the following claims.

What is claimed is:

1. A method of controlling a speech code in a communications system having at least two mobile switching centers capable of converting a coding process for a speech signal and interconnected by an Internet Protocol network, to control the coding process in the Internet Protocol network for the speech signal between mobile terminals registered in said two mobile switching centers while the mobile terminals are communicating with each other, said method comprising:

communicating between the two mobile switching centers over said Internet Protocol network using a field in an Internet Protocol header of a packet to determine whether coding processes employed by said mobile terminals are the same as each other;

if the coding processes are the same as each other, keeping unconverted the coding processes used by the two mobile switching centers for the speech signal, and transmitting the speech signal directly carried on a packet through said Internet Protocol network; and if the coding processes are not the same as each other, converting the coding processes used by the two mobile switching centers for the speech signal into a general-purpose coding process for the speech signal to be transmitted through said Internet Protocol network.

2. A method according to claim 1, wherein one of said mobile switching centers acquires information of the coding process used by said mobile terminal registered in the other mobile switching center from said other mobile switching center, and compares the acquired information with the coding process used by the mobile terminal registered in its own mobile switching center to determine whether the coding processes employed by said two mobile terminals are the same as each other.

3. A method of controlling a speech code in a communications system having at least two mobile switching centers capable of converting a coding process for a speech signal and interconnected by an Internet Protocol network, to control the coding process in the Internet Protocol network for the speech signal between mobile terminals registered in said two mobile switching centers when a call is established between the mobile terminals, said method comprising:

communicating between the two mobile switching centers over said Internet Protocol network using a field in an Internet Protocol header of a packet when a call is established, to determine whether there is a coding process which can commonly be used by said mobile terminals;

if there is a coding process which can commonly be used by said mobile terminals, instructing the mobile terminals to use said coding process, keeping unconverted the coding processes used by the two mobile switching centers for the speech signal, and transmitting the speech signal directly carried on a packet through said Internet Protocol network; and if there is no coding process which can commonly be used by said mobile terminals, converting the coding processes used by the two mobile switching centers for the speech signal into a general-purpose coding process for the speech signal to be transmitted through said Internet Protocol network.

4. A method according to claim 3, wherein one of the mobile switching centers on an origination side indicates, to the other mobile switching center on a termination side, a coding process which can be used by one of the mobile terminals on the origination side, the mobile switching center on the termination side determines whether there is a coding process which can commonly be used by said mobile terminals or not, and if there is a coding process which can commonly be used by said mobile terminals, said mobile switching center on the termination side indicates said coding process to the mobile switching center on the origination side, and the mobile switching center on the origination side instructs the mobile terminals to use said coding process.

5. A method of controlling a speech code in a communications system having at least two mobile switching centers capable of converting a coding process for a speech signal and interconnected by an Internet Protocol network, to control the coding process in the Internet Protocol network for the speech signal between mobile terminals registered in said two mobile switching centers while the mobile terminals are communicating with each other, said method comprising:

keeping unconverted the coding processes used by the two mobile switching centers for the speech signal, and transmitting the speech signal directly carried on a packet through said Internet Protocol network;

if either one of the mobile terminals requests supplementary services which cannot be used according to the coding process for the speech signal, communicating between the two mobile switching centers using a field in an Internet Protocol header of a packet to cause the two mobile switching centers to start converting the coding process for the speech signal into a general-purpose coding process for the speech signal to be transmitted through said Internet Protocol network.

6. A method according to claim 5, wherein when the use of said supplementary services is finished, said two mobile switching centers communicate with each other using the field in the Internet Protocol header of the packet, the conversion of the coding process for the speech signal with the two mobile switching centers is stopped, and the speech signal is directly carried on a packet and transmitted through said Internet Protocol network.

7. A method of controlling a speech code in a communications system having at least two Internet Protocol switching centers capable of encoding and decoding an analog speech signal according to one of a plurality of coding processes having different bit rates and interconnected by an Internet Protocol network, to control the coding process in the Internet Protocol network for the speech signal between telephone sets accommodated by said two Internet Protocol switching centers while the telephone sets are communicating with each other, said method comprising:

if a load on said Internet Protocol network is detected as exceeding a threshold in one of said Internet Protocol switching centers, communicating between said Internet Protocol switching centers using a field in an Internet Protocol header of a packet to change said coding process to a coding process having a lower bit rate; and if a load on said Internet Protocol network is detected as being smaller than a threshold in one of said Internet Protocol switching centers, communicating between said Internet Protocol switching centers using a field in an Internet Protocol header of a packet to change said coding process to a coding process having a higher bit rate.

8. A mobile switching center connected to another mobile switching center through an Internet Protocol network for establishing communications between a mobile terminal registered in its own and a mobile terminal registered in the other mobile switching center and converting a coding process for a speech signal used in the communications, said mobile switching center comprising:

a transcoder for converting the coding process for the speech signal; and a controller for communicating with said other mobile switching center using a field in an Internet Protocol header of a packet while the mobile terminals are communicating with each other, to determine whether coding processes employed by said mobile terminals are the same as each other or not, and, if the coding processes are the same as each other, keeping unconverted the coding process for the speech signal, and transmitting the speech signal directly carried on a packet through said Internet Protocol network to and from said other mobile switching center, and, if the coding processes are not the same as each other, converting the coding process for the speech signal with said transcoder into a general-purpose coding process for the speech signal to be transmitted through said Internet Protocol network.

9. A mobile switching center connected to another mobile switching center through an Internet Protocol network for establishing communications between a mobile terminal registered in its own and a mobile terminal registered in the other mobile switching center and converting a coding process for a speech signal used in the communications, said mobile switching center comprising:

a transcoder for converting the coding process for the speech signal; and a controller for communicating with said other mobile switching center using a field in an Internet Protocol header of a packet when a call is established, to determine whether there is a coding process which can commonly be used by said mobile terminals or not, and, if there is a coding process which can commonly be used by said mobile terminals, instructing the mobile terminal registered in its own to use said coding process, keeping unconverted the coding process for the speech signal, and transmitting the speech signal directly carried on a packet through said Internet Protocol network to and from the other mobile switching center, and, if there is no coding process which can commonly be used by said mobile terminals, converting the coding process for the speech signal with said transcoder into a general-purpose coding process for the speech signal to be transmitted through said Internet Protocol network.

10. An Internet Protocol switching center connected to another Internet Protocol switching center through an Internet Protocol network for establishing communications between a telephone set registered in its own and a telephone set registered in the other Internet Protocol switching center and selecting a coding process used in the communications in the Internet Protocol network from a plurality of coding processes having different bit rates, said mobile switching center comprising:

a coder/decoder for selecting and using either one of said coding processes; and a controller for, if a load on said Internet Protocol network is detected as exceeding a threshold, communicating with said other Internet Protocol switching center using a field in an Internet Protocol header of a packet, and instructing said coder/decoder to select and use a coding process having a lower bit rate, and, if a load on said Internet Protocol network is detected as being smaller than a threshold, communicating with said other Internet Protocol switching center using a field in an Internet Protocol header of a packet, and instructing said coder/decoder to select and use a coding process having a higher bit rate.

11. A method according to claim 1, wherein keeping the coding processes unconverted includes making a bypass connection at the time a call is originated between the mobile terminals.

12. A method according to claim 3, wherein keeping the coding processes unconverted includes making a bypass connection at the time a call is originated between the mobile terminals.

13. A method according to claim 5, wherein keeping the coding processes unconverted includes making a bypass connection at the time a call is originated between the mobile terminals.

14. A method according to claim 7, further comprising creating a bypass connection at the time a call is originated between the telephone sets.

15. A method according to claim 8, wherein keeping the coding processes unconverted includes making a bypass connection at the time a call is originated between the mobile terminals.

16. A mobile switching center according to claim 9, wherein when the controller keeps the coding processes unconverted a bypass connection is made at the time a call is originated between the mobile terminals.

17. A method according to claim 1, wherein said determining whether said coding processes employed by said mobile terminals are the same as each other occurs before communication between the mobile terminals is established.

18. A method according to claim 7, wherein detecting a load in one of the Internet Protocol switching centers as exceeding a threshold occurs before communication between the telephone sets is established.

* * * * *